United States Patent [19]

Moribe

[11] Patent Number: 4,866,914
[45] Date of Patent: Sep. 19, 1989

[54] METHOD AND DEVICE FOR SEALING THE MOUTH OF A POUCH

[75] Inventor: Hiroshi Moribe, Yao, Japan

[73] Assignee: Seal Industrial Co., Ltd., Osaka, Japan

[21] Appl. No.: 221,451

[22] Filed: Jul. 15, 1988

[30] Foreign Application Priority Data

May 11, 1988 [JP] Japan ................................ 63-115593

[51] Int. Cl.[4] .......................... B65B 7/06; B65B 51/22
[52] U.S. Cl. ........................................ 53/479; 53/76;
  53/373; 156/73.1; 156/580.1
[58] Field of Search ................. 53/67, 70, 76, 371,
  53/373, 477, 479, 481, DIG. 2; 156/73.1, 359,
  364, 580.1, 580.2

[56] References Cited

U.S. PATENT DOCUMENTS

| | | | |
|---|---|---|---|
| 2,676,444 | 4/1954 | Gaubert | 53/DIG. 2 X |
| 3,200,558 | 9/1962 | Adams et al. | 53/76 |
| 3,242,029 | 3/1966 | Deans | 156/73.1 X |
| 3,886,713 | 6/1975 | Mitchell et al. | 53/76 X |
| 4,159,220 | 6/1979 | Bosche et al. | 53/479 X |
| 4,534,818 | 8/1985 | Kreager et al. | 53/479 X |
| 4,734,142 | 3/1988 | Creswell | 156/73.1 |
| 4,767,492 | 8/1988 | Fukusima et al. | 53/373 X |

FOREIGN PATENT DOCUMENTS

| | | | |
|---|---|---|---|
| 52-146387 | 12/1977 | Japan . | |
| 0738958 | 6/1980 | U.S.S.R. | 53/DIG. 2 |

Primary Examiner—Robert L. Spruill
Assistant Examiner—Linda B. Johnson
Attorney, Agent, or Firm—Wenderoth, Lind & Ponack

[57] ABSTRACT

A pouch made of a heat-fusible material is sealed at its mouth while being transferred on a conveyor. A vibrator provided at one side of the track of the conveyor is pressed against the mouth of the pouch for vibrative heating in response to a signal from a sensor and is moved away from the mouth in response to a sensor signal. The sensor detects the coming and passing of the pouch at and through the sealing station. The pouch preferably has an open mouth with a presealed leading edge which ensures that the entire mouth is completely sealed. The provision of the presealed leading edge along with the vibrator for vibrative heat-sealing ensures that a good seal is produced even if powder or fat has adhered to the sealing surface.

2 Claims, 2 Drawing Sheets

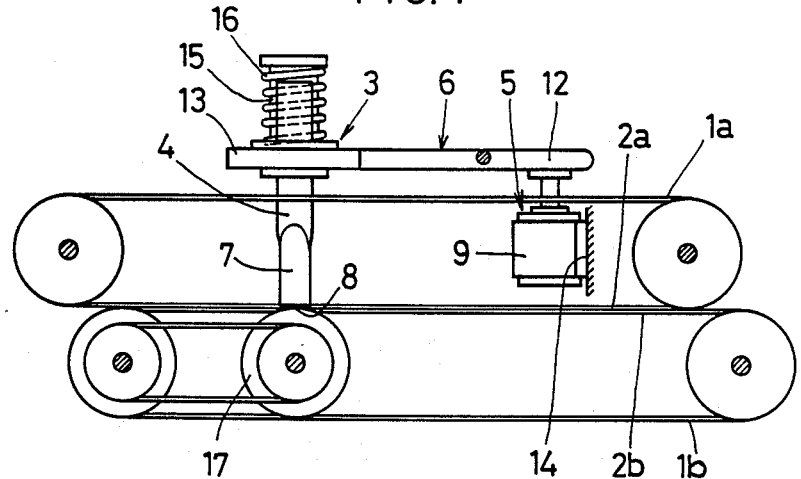
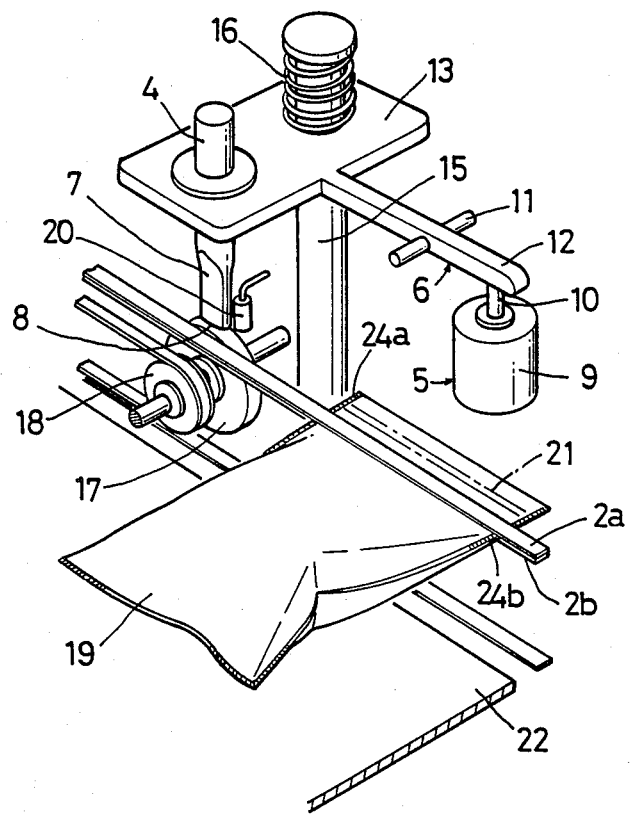

METHOD AND DEVICE FOR SEALING THE MOUTH OF A POUCH

BACKGROUND OF THE INVENTION

1. Field of the Invention

The present invention relates to a method and a device for sealing the mouth of a pouch made of a heat-fusible material.

2. Description of the Prior Art

Fusing with hot plates is the commonest way of sealing the mouth of a pouch packed with an article, if the pouch is made of a heat-fusible material such as synthetic resin. But this method has a drawback that if the packed material is powdery or fatty, it tends to adhere to the inner surface of the pouch at its mouth, resulting in poor fusing.

Japanese Unexamined Utility Model Publication No. 58-156606 tackled this problem by use of ultrasonics. The heat-sealer disclosed in this Publication imparts ultrasonic vibrations to the mouth of a pouch to induce molecular-level vibrations. The mouth is fused together by heat generated by the molecular-level vibrations. With this method, a perfect seal is obtained even if a powdery or fatty material is adhering to the inner surface of the mouth. In order to efficiently impart vibrations to the sealing portion to ensure a strong bond, the sealing portion has to be tightly pressed between the vibrator and its support member while being vibrated. But since the pouch to be sealed is usually made of a limp film, it is difficult to insert it into between them.

In the above-described Japan 58-15606 the support member is in the form of a roller having its periphery toothed. With the rotation of the roller, its toothed surface catches the mouth of a pouch to feed it into the sealing station. But in this method, the mouth is fused only intermittently according to the distances between the teeth. Thus this method is not applicable to a pouch containing a powdery or liquid material because such a material tends to leak through openings between the fused portions. If the roller surface is formed with so fine teeth that the openings formed between the fused portions will be small enough to prevent the content from leaking, then it becomes difficult for the roller to smoothly catch the pouch and draw it into the sealing station.

On the other hand, Japanese Unexamined Patent Publication No. 52-146387 discloses a device for sealing a carton made of cardboard by vibration heating. With this device, the carton to be sealed is fed into a sealing station intermittently. A vibrator is lowered to be pressed against the carton after the feed of carton has been stopped. Though with this device, the problem with the first-mentioned Publication has been solved, it is necessary to drive belt conveyors intermittently. This will complicate the control of the machine and worsen the working efficiency.

SUMMARY OF THE INVENTION

It is an object of the present invention to provide a method and device for sealing the mouth of a pouch which allow the pouch to be fed continuously, which provide a continuous seal line, and which can smoothly feed even a pouch made of a limp film into between a vibrator and a support member.

In the present invention, the vibrator is lowered against the leading end of the mouth of the pouch after it has arrived at the sealing station between the vibrator and the support member. Thus the pouch can be smoothly inserted into and passed through the sealing station. Since the mouth is heat-sealed at both ends beforehand, there is no fear that the content may leak therefrom.

The pouch with its mouth sandwiched between the belt conveyors is transferred into the sealing station. The sensor detects the approach of the pouch and causes the vibrator to be lowered and pressed against the support member with the mouth of the pouch sandwiched therebetween. The vibrator will collide with the support member and vibrate so as to fuse the front and back sheets of the pouch together at its opening. Any foreign substance such as powder or fat adhering to the sealing surface is removed at the same time, thus providing a perfect and continuous seal. As soon as the pouch clears the sealing station, the sensor will signal the vibrator to be raised to its inoperative position.

Since the vibrator has its bottom pressure application surface arcuately configured, the pouch will be fed smoothly by the conveyors once it is inserted into between the vibrator and the support member.

Other features and objects of the present invention will become apparent from the following description taken with reference to the accompanying drawings, in which:

BRIEF DESCRIPTION OF THE DRAWINGS

FIG. 1 is a front view of the device for sealing the mouth of a pouch embodying the present invention;

FIG. 2 is an enlarged perspective view of a portion of the same;

DETAILED DESCRIPTION OF THE PREFERRED EMBODIMENT

Figure 3:
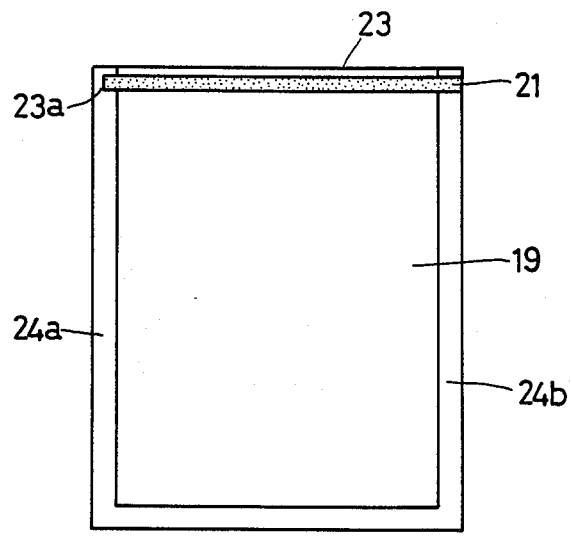
FIG. 3 is a front view of a pouch sealed by use of the device of the present invention.

Now referring to FIG. 1, a pair of belt conveyors 1a and 1b are arranged one upon the other and have belts 2a and 2b, respectively, which are as narrow as 10 mm. A pouch 19 is transferred to the lefthand side of FIG. 1 with its mouth sandwiched between the belts 2a and 2b. There is provided a vertically vibrating horn 3 at one side of the track of the opposed belt portions 2a and 2b which run in the same direction in a juxtaposed relationship. The horn 3 comprises a vibrator 4, an elevator means 5 and a leverage disposed between them.

The vibrator 4 should preferably be capable of vibrating about 20,000 times per minute when energized. It is in the form of a round bar and has its lower end 7 flattened in the direction in which the belts run. It has a bottom surface 8 arcuately convexed in the longitudinal direction of the belts.

In the preferred embodiment, the elevator means 5 is in the form of a solenoid comprising a cylindrical casing 9, an electromagnet mounted in the casing 9 and a retractable shaft 10 extending in the center. The shaft 10 is adapted to move downwardly by a predetermined distance when the solenoid is energized.

The leverage 6 comprises a transverse shaft 11 and a lever 12 having its mid-portion fixed to the transverse shaft 11 so as to be pivotable thereabout. The lever 12 has its one end fixed to the top of the retractable shaft 10, and its other end integral with a plate 13 carrying the vibrator 4.

The casing 9 for the solenoid is fixedly mounted to a stationary member 14. A post 15 having its bottom fixed to the floor loosely extends through the plate 13 so that the plate will be vertically slidable along the post. The plate 13 is normally biased downwardly by a spring 16 mounted around the upper part of the post 15.

Right under the vibrator 4 is provided a roller 17 made of a rigid material and adapted to rotate in the same direction as the direction in which the inner belt portions 2a and 2b run. Its highest portion is substantially at the same level as the inner belt portions 2a and 2b. The roller 17 is adapted to receive the bottom end face 8 of the vibrator 4.

The roller 17 rotates at a peripheral speed equal to the travel speed of the belt portions 2a and 2b. Numeral 18 designates a roller driving means. The vibrator 4 may have its bottom end face received on a plate member instead of the roller 17.

At one side of the lower end of the vibrator 4, there is provided a sensor 20 for detecting the position of the pouch 19 packed with a powdery or fatty material when it approaches and leaves the sealing station with its mouth sandwiched between the belt portions 2a and 2b and its body on a conveyor 22.

Next, it will be described how the device operates.

The pouch 19 is heat-sealed beforehand at three sides as shown in FIGS. 2 and 3 at 24a and 24b with only one side 23 left unsealed to seal a commodity therethrough. This step can be carried out in an inexpensive known manner by use of hot plates because the pouch has not been packed. After the pouch 19 has been packed, it is inserted into between the running belt conveyors 1a and 1b at their one end (at the righthand side of FIG. 1) in such a manner that its unsealed side will protrude from the belts toward the horn 3 (FIG. 2). Thus the pouch is transferred by the conveyors 22 and the belts 2a and 2b of belt conveyors 1a and 1b in the direction of travel thereof.

As the pouch 19 draws near to the vibrator 4, the sensor 20 will detect its coming and cause the vibrator 4 to be energized and at the same time deenergize the solenoid. This will cause the vibrator 4 to descend urged by the spring 16 until it is pressed against the roller 17 through the mouth 23 of the pouch 19. The travel speed of the conveyors 1a, 1b and 22 as well as the timing of deenergization of the solenoid are controlled so that the vibrator 4 will exactly get on the extreme end area of the unsealed side 23 shown at 23a in FIG. 3. The vibrator 4 may be normally energized.

The vibrator 4 keeps vibrating at very small amplitude while being pressed against the roller 17 through the pouch 19. The micro-vibrations of the vibrator serve to fuse the mouth 23 in the form of a strip 21 as the pouch moves on.

As the pouch 19 clears the vibrator 4 (that is, the sealing station), the sensor 20 detects its position and causes the vibrator 4 to be deenergized and the solenoid to be energized to raise the vibrator 4 away from the roller 17.

Figure 4:
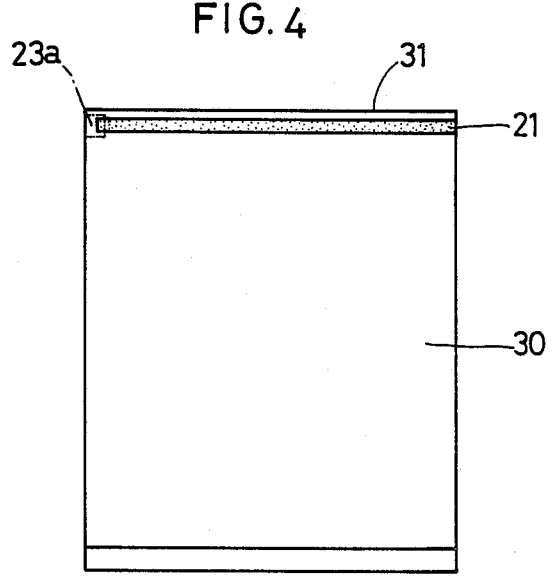
FIG. 4 is a similar view showing the method of sealing a different type of pouch.

If the leading end 23a of the opening is not sealed as shown in FIG. 4, it is necessary to heat-seal this portion beforehand as shown by chain line in order to prevent the content from leaking therethrough.

What is claimed is:

1. A method for sealing an unsealed mouth with a presealed leading edge of a pouch made of a heat-fusible material and packed with a commodity by vibrative heating, the method comprising the steps of:

providing a pouch having a plurality of closed sides and an unsealed open side defining a mouth, and the mouth having a presealed leading edge;

transferring the pouch on a conveyor in a predetermined direction of travel with its mouth sandwiched between a pair of opposed belt portions, and with the presealed leading edge of the pouch being the forwardmost edge of the mouth of the pouch with respect to the direction of travel of the pouch;

pressing a vibrator against the portion of the pouch to be heat-fused in response to a signal from a sensor for sensing the coming of the pouch at a sealing station and energizing simultaneously said vibrator to heat-seal the mouth of the pouch; and moving said vibrator away from the thus heat-sealed mouth of the pouch into an inoperative position in response to a signal from said sensor issued upon the passing of the pouch through the sealing station of said pressing step.

2. A device for sealing an unsealed mouth with a presealed leading edge of a pouch made of a heat-fusible material and packed with a commodity, comprising:

a conveyor means for transferring a pouch in a predetermined direction of travel and with the presealed leading edge of the pouch being the forwardmost edge of the pouch with respect to the direction of travel of the pouch;

a vibrator disposed adjacent to said conveyor means and being vibratable when energized, said vibrator being movable toward and away from a vibrator support means to and from an operative position;

means for moving said vibrator into its operative position in response to a signal from a sensor;

a vibrator support means for receiving said vibrator with the mouth of the pouch sandwiched between said vibrator and said vibrator support means, and said vibrator and said vibrator support means defining a sealing station, and said sealing station sealing the unsealed mouth with a sealed leading edge of a pouch when said vibrator is in its operative position; and a sensor for detecting the coming and passing of a pouch at and through the sealing station and for signaling said vibrator moving means to move said vibrator into and from its operative position.

* * * * *